(12) United States Patent
Wang et al.

(10) Patent No.: US 11,559,767 B2
(45) Date of Patent: Jan. 24, 2023

(54) METHOD FOR CARBON DIOXIDE CAPTURE AND SEQUESTRATION USING ALKALINE INDUSTRIAL WASTES

(71) Applicant: Wisconsin Alumni Research Foundation, Madison, WI (US)

(72) Inventors: Bu Wang, Madison, WI (US); Raghavendra Ragipani, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/318,424

(22) Filed: May 12, 2021

(65) Prior Publication Data

US 2021/0354084 A1    Nov. 18, 2021

Related U.S. Application Data

(60) Provisional application No. 63/023,302, filed on May 12, 2020.

(51) Int. Cl.
*B01D 53/96* (2006.01)
*B01D 53/78* (2006.01)
*B01D 53/62* (2006.01)
*B01D 53/14* (2006.01)
*C01F 11/18* (2006.01)

(52) U.S. Cl.
CPC ......... *B01D 53/78* (2013.01); *B01D 53/1425* (2013.01); *B01D 53/1475* (2013.01); *B01D 53/62* (2013.01); *B01D 53/96* (2013.01); *C01F 11/181* (2013.01); *B01D 2251/304* (2013.01); *B01D 2251/306* (2013.01); *B01D 2257/504* (2013.01)

(58) Field of Classification Search
CPC .. B01D 2251/306; B01D 53/62; B01D 53/96; B01D 2251/304; B01D 53/1425; B01D 53/78; B01D 2257/504; B01D 2251/404; B01D 53/1475; C01F 11/181; Y02C 20/40
See application file for complete search history.

(56) References Cited

U.S. PATENT DOCUMENTS

| | | | | |
|---|---|---|---|---|
| 5,100,633 A | * | 3/1992 | Morrison | B01D 53/60 423/243.1 |
| 8,815,192 B1 | * | 8/2014 | Phelps, Sr. | B01D 53/96 423/619 |
| 2008/0289319 A1 | | 11/2008 | Eisenberger et al. | |
| 2012/0238006 A1 | | 9/2012 | Gartner et al. | |
| 2013/0280152 A1 | | 10/2013 | Singh | |
| 2014/0205521 A1 | | 7/2014 | Neumann et al. | |

FOREIGN PATENT DOCUMENTS

| | | | | |
|---|---|---|---|---|
| JP | 2007/098307 A | 4/2007 | | |
| WO | WO 2007 071 633 A1 | * 6/2007 | | B01D 53/62 |

OTHER PUBLICATIONS

Kheshgi H. (1995) "Sequestering Atmospheric Carbon Dioxide by Increasing Ocean Alkalinity," *Energy*, 20 (9):912-922.
International Search Report and Written Opinion, PCT/IB2021/054068, dated Jul. 22, 2021.

* cited by examiner

*Primary Examiner* — Timothy C Vanoy
(74) *Attorney, Agent, or Firm* — Joseph T. Leone; DeWitt LLP

(57) ABSTRACT

A method of sequestering gaseous carbon dioxide in which an oxide is carbonated by contacting it with a first aqueous carbonate solution to convert a portion of the oxide into a carbonate, which precipitates from solution. By converting the oxide to a solid carbonate, the $CO_2$ from the first carbonate solution is sequestered into the precipitate. At the same time, an aqueous hydroxide solution is formed. The aqueous hydroxide solution is contacted with gaseous carbon dioxide which sequesters the gaseous $CO_2$ into a second aqueous carbonate solution. The second solution so generated is then recycled back into the process and used to convert the oxide into the precipitated carbonate.

20 Claims, 1 Drawing Sheet

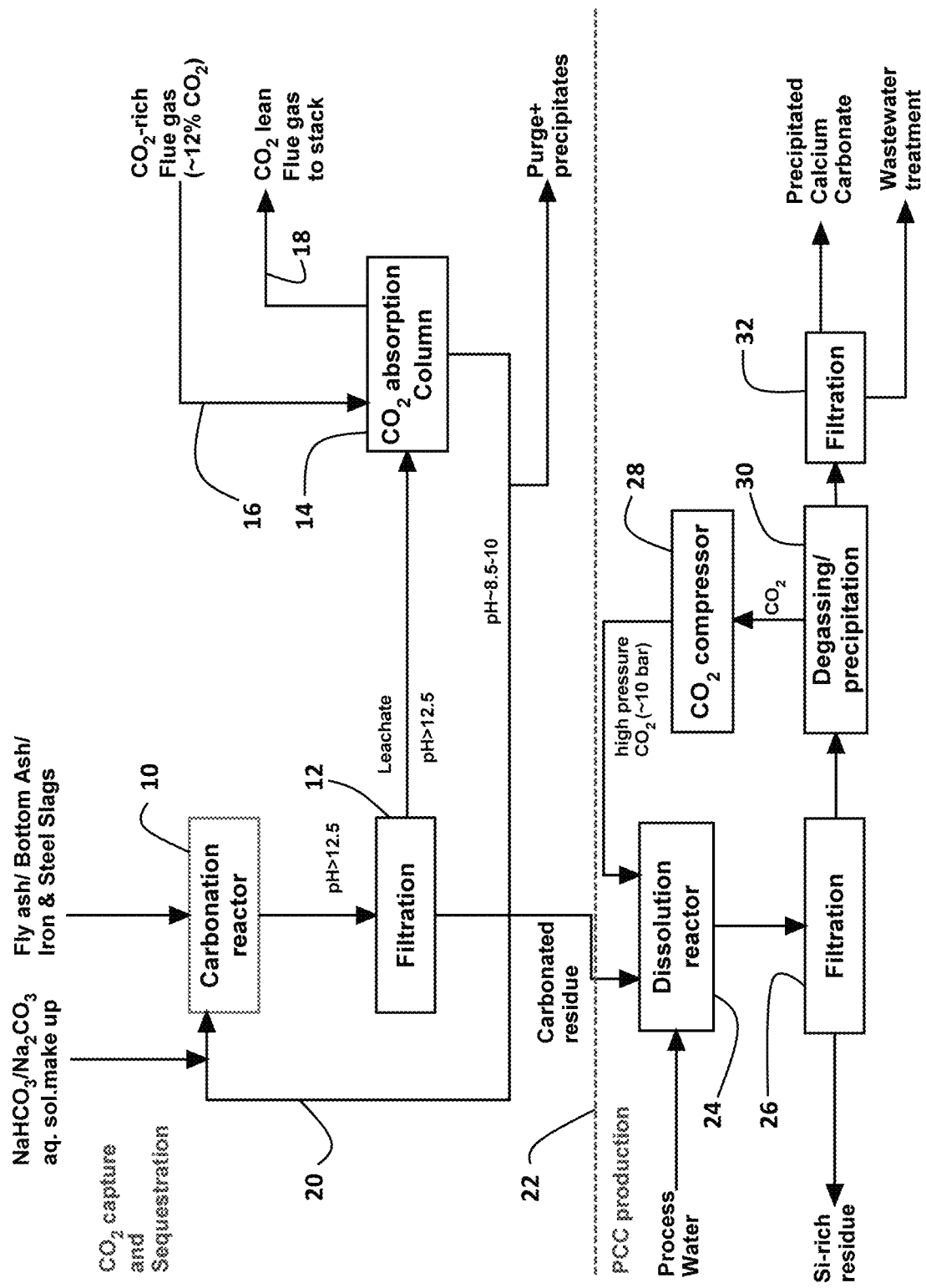

METHOD FOR CARBON DIOXIDE CAPTURE AND SEQUESTRATION USING ALKALINE INDUSTRIAL WASTES

CROSS-REFERENCE TO RELATED APPLICATIONS

Priority is hereby claimed to provisional application Ser. No. 63/023,302, filed May 12, 2020, which is incorporated herein by reference.

FEDERAL FUNDING STATEMENT

This invention was made with government support under DE-FE0031705 awarded by the US Department of Energy. The government has certain rights in the invention.

BACKGROUND

Carbon dioxide is the most voluminous greenhouse gas produced by human activity. Carbon sequestration is the process of capturing and storing atmospheric carbon dioxide, or otherwise converting gaseous carbon dioxide into some other innocuous form. The goal of carbon dioxide sequestration is to reduce the impact of carbon dioxide production on global climate change.

The scientific and patent literature regarding carbon dioxide capture and sequestration is extensive and covers several distinct approaches. For example, U.S. Pat. No. 5,100,633, issued Mar. 31, 1992, to Morrison, describes a process for scrubbing acid-forming gases, including sulfur dioxide and carbon dioxide, from flue gases. The untreated flue gas is first passed through a heat exchanger and then reacted with an aqueous, alkaline scrubbing solution. After the reaction, the solution, now containing dissolved salts with a precipitate of any insolubles, is passed through another heat exchanger to evaporate the water. These leaves a solid residue of crystallized, carbon-containing salts.

Grander schemes have included fundamentally altering the carbon balance of the planet by increasing the alkalinity of the oceans. See H. Kheshgi (1995) "Sequestering Atmospheric Carbon Dioxide by Increasing Ocean Alkalinity." *Energy*, 20 (9):912-922. Here, the author proposes adding calcium oxide to the oceans in sufficient quantity to increase the carbon dioxide-absorbing capacity of the oceans. Clearly such a far-reaching "solution" is not feasible.

Chemical reactions of gaseous carbon dioxide, water, and carbonate minerals have been extensively studied. For a thorough review, see Morse and Mackenzie, "Geochemistry of Sedimentary Carbonates" ISBN 978-0444873910, © 1990. Elsevier Science (Amsterdam, Netherlands). These studies, though, are in the context of sedimentology, rather than carbon dioxide capture.

There remains a long-felt and unmet need for an economically feasible, scientifically feasible, and effective method for capturing and sequestering man-made carbon dioxide.

SUMMARY

Disclosed herein is a method of sequestering gaseous carbon dioxide. The method comprises carbonating an oxide or hydroxide by contacting a material comprising the oxide or hydroxide with a first aqueous carbonate solution. This is done for a time, at a temperature, and under conditions such that at least a portion of the oxide or hydroxide is converted into a carbonate and wherein at least a portion of the carbonate so formed precipitates from the aqueous carbonate solution. At the same time, an aqueous hydroxide solution is formed. The aqueous hydroxide solution is used to capture at least a portion of carbon dioxide from a gas stream, such as flue gas. The aqueous hydroxide solution formed in the first step is contacted with the gaseous carbon dioxide for a time, at a temperature, and under conditions wherein at least a portion of the gaseous carbon dioxide is sequestered into a second aqueous carbonate solution by reacting with the hydroxide present in the aqueous hydroxide solution. This yields a second aqueous solution comprising dissolved carbonate. All or a portion of the second aqueous carbonate solution may then be recycled back into the process as the first aqueous carbonate solution. The process then begins anew—either continuously or batchwise.

As noted previously, the solid reactant comprising the oxide or hydroxide is preferably some type of solid waste, such as industrial or municipal waste, for example fly ash, bottom ash, slag, and/or crushed concrete.

In all variations of the process, any carbonate that is sparingly soluble to very soluble in water may be used. It is preferred, though, that the first and second aqueous carbonate solutions comprise one or more carbonates selected from the group consisting of sodium carbonate, potassium carbonate, sodium bicarbonate, and potassium bicarbonate. When a carbonate comprising sodium is used, the aqueous hydroxide solution formed comprises sodium hydroxide. Likewise, when a carbonate comprising potassium is used, the aqueous hydroxide solution formed comprises potassium hydroxide.

It is generally preferred, but not required, that the first aqueous carbonate solution is saturated with carbonate. The aqueous carbonate solution may also have a carbonate concentration of from about 0.01 M to about 3.0 M carbonate.

In terms of general reaction parameters, the material comprising the oxide or hydroxide is preferably contacted with the first aqueous carbonate solution for up to 24 hours, and more preferably from about 5 minutes to about 60 minutes, at a temperature of about 20° C. to about 100° C., at a pressure of about 1 atmosphere. To hasten the reaction and to maximize carbon dioxide sequestration, the material comprising the oxide or hydroxide is preferably in the form of a bulk particulate matter having a mean particle diameter no larger than about 1 mm and more preferably still no larger than 100 micrometers. Larger particles, of course, can be treated using the method. Smaller particles sizes, though, encourage more complete reaction.

The material comprising the oxide or hydroxide may be contacted with the first aqueous carbonate solution at a loading of from about 1 mL to about 500 mL of the first aqueous carbonate solution per gram of the material comprising the oxide.

The first step of the process will yield precipitated calcium carbonate (along with other impurities) if the starting oxide material comprises calcium oxide or calcium hydroxide. It is beneficial to recover the precipitated calcium carbonate (PCC) because it is widely used in industries such as papermaking. Here, when the oxide being treated comprises calcium, and the precipitate therefore comprises calcium carbonate, the method may further optionally comprise contacting the calcium carbonate precipitate with water and gaseous carbon dioxide at a pressure above atmospheric pressure, for a time, and at a temperature where at least a portion of the calcium carbonate dissolves into the water to yield a solution comprising calcium carbonate. At least a portion of this calcium carbonate solution may then be separating from any remaining solids. The pressure of the carbon dioxide is then reduced to a level wherein calcium carbonate precipitates from the solution comprising calcium carbonate. Generally, the pressure of the carbon dioxide should be from about 2 to about 10 atmospheres. Pressures above and below this range are explicitly encompassed by the method. The reaction may proceed at room temperature. The preferred temperature range of the dissolution is from roughly 10° C. to about 50° C.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The indefinite articles "a" and "an" mean "one or more" unless explicitly stated to the contrary.

All combinations of method or process steps as used herein can be performed in any order, unless otherwise specified or clearly implied to the contrary by the context in which the referenced combination is made.

The methods disclosed herein can comprise, consist of, or consist essentially of the essential elements and limitations described herein, as well as any additional or optional ingredients, components, or limitations described herein or otherwise useful in handing wet or dry particulate waste matter.

BRIEF DESCRIPTION OF THE DRAWING

The sole drawing FIGURE is a flow chart showing an exemplary version of the carbon dioxide sequestration method described and claimed herein.

DETAILED DESCRIPTION

As noted above, mineralization of carbon dioxide using industrial wastes is being actively studied to reduce carbon dioxide emissions to the atmosphere. Conventional sequestration methods consist of either single-step direct carbonation approaches or multi-step indirect carbonation to produce precipitated calcium carbonate. A typical indirect carbonation process involves a dissolution step to extract calcium, preferably in an acidic environment, which is followed by a calcium carbonate precipitation step. Often, an intermittent pH-swing step is required to increase leachate pH and facilitate carbonate precipitation.

Disclosed herein is a novel method based on the following chemical reactions:

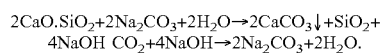
4NaOH CO$_2$+4NaOH→2Na$_2$CO$_3$+2H$_2$O.

Two underlying principles make the method less energy-intensive than existing schemes and thus more economically attractive:

1) Carbonation of calcium oxides, silicates and aluminates using sodium carbonate or potassium carbonate solutions increases the pH of the aqueous reaction solution due to the generation of soluble sodium hydroxide or potassium hydroxide.

2) Absorption of the carbon dioxide from dilute streams into sodium hydroxide solution (~pH>12) is efficient and regenerates sodium carbonate and/or potassium carbonate, which is then recycled.

The method can, if desired, be implemented in two stages, which taken together sequesters gaseous carbon dioxide into a solid carbonate. As an added benefit, the process also yields highly pure precipitated calcium carbonate. The first stage carbonates the alkaline industrial residues such as coal ashes, iron and steel slags, etc., using dilute carbon dioxide streams such as flue gas from power plants, carbon dioxide from biogas plants, or natural gas processing plants, to name a few. The second stage produces precipitated calcium carbonate (PCC) from carbonated residues obtained from either the first stage of the present method or from carbonated residues from other CO$_2$ sequestration processes.

In the preferred version of the method, industrial alkaline residues are pulverized to roughly about 1 mm in size or smaller, preferably smaller than 100 micrometers. Smaller particle sizes are preferred because it increased the available surface area, which increases the rate and efficiency of the carbonation reaction. Mean particle size can be determined by any number of conventional means, such as sieving analysis, laser diffraction, and dynamic light scattering. These are conventional methods and well known to those skilled in the art.

The bulk powdered industrial residue is then reacted with an aqueous solution of a carbonate, such as sodium carbonate/bicarbonate solution and/or potassium carbonate/bicarbonate solution, and the like. Preferably the solution is saturated with the carbonate. The method may proceed, though, using a solution that is less than saturated with the carbonate. Solutions with carbonate concentrations of from about 0.01 M to about 3.0 M. Higher concentrations, all the way to the solubility limit, are preferred.

The solid loading is optionally in the range of from about 2 to about 200 ml of carbonate solution per g of solid being treated. As a general principal, more solution per solid is preferred to increase the carbonation yield. The reaction temperature for carbonation is preferably from about 20° C. to about 100° C. Temperatures above and below this are within the scope of the method. Higher temperatures are generally preferred to increase the carbonation reaction rate and yield. The reaction is preferably conducted at atmospheric pressure.

In either batch or continuous reactors, the reaction time is generally from about 5 minutes to about 60 minutes. Reaction times above and below this range are explicitly within the scope of the method. Generally, long reaction times maximize carbonate yield. Ultimate yield, though, depends on many factors, including the particle size distribution of industrial residue to be carbonated and other process parameters, such as the nature of the waste being treated. The carbonated residue is filtered/dewatered from the leachate using any method now known or developed in the future. Conventional hydrocyclone/gravity separation, centrifugal filtration, or other conventional filtration equipment may be used.

The filtered leachate, which is alkaline, is used to absorb carbon dioxide from flue gas or other carbon dioxide-rich stream. This is preferably done in an absorption column or other suitable reaction vessel. Elevated temperatures generally improve the CO$_2$ absorption rate, but only to a point. If the incoming gas stream to be treated is very hot, it might have to be cooled prior to treatment. Thus, incoming flue gas that is already at temperatures above about 100° C. and lower than about 200° C. may be directly absorbed without cooling. The $CO_2$ lean flue gas exiting from the absorption column is sent to the stack for release to the atmosphere. Any silicon or aluminum in the leachate is precipitated inside the absorption column as oxide and hydroxide, respectively, and are optionally separated by filtration. The filtered liquid is sodium bicarbonate/carbonate solution, which is available for recycling to the carbonation reactor. A fresh stream of sodium carbonate solution may optionally be added to make up for the solvent losses during filtration.

The carbonated solid residue obtained after carbon dioxide sequestration from industrial wastes contains calcium carbonate along with impurities such as silicates, aluminates, etc. To recover calcium carbonate, the residue is charged into a dissolution reactor filled with water (preferably distilled to obtain the highest purity PCC possible) and pressurized with $CO_2$. The $CO_2$ pressure can be up to 10 atm or higher; higher pressure is better for the yield in that more calcium carbonate dissolves into the $CO_2$-saturated water. The reaction can take place at ambient temperature.

The dissolution may be carried out in a pressurized vessel such as an autoclave/slurry column or equivalent equipment. The solid residue remaining after the dissolution is separated from the aqueous solution containing dissolved calcium carbonate. The filtered solution is then degassed to release $CO_2$ and spontaneously precipitate calcium carbonate. Degassing is carried out at atmospheric conditions. For improved recovery of $CO_2$ and regulating the PCC morphology, degassing may be carried out under vacuum at elevated temperatures (up to about 80° C.). The released carbon dioxide may be captured, compressed, and recycled back into to the dissolution reactor. The calcium carbonate slurry from the degassing unit is filtered using a filter press or equivalent filtration equipment to recover precipitated calcium carbonate (PCC). The filtered water is either recycled to the dissolution reactor or sent to wastewater treatment for disposal.

An exemplary flow chart illustrating the method is shown in the sole drawing FIGURE. The FIGURE is divided into an upper section and a lower section by the dashed horizontal line 22. The upper section is titled "$CO_2$ capture and sequestration." As shown in the drawing, a carbonation reactor 10 is provided. One of the reactants is an oxide- or hydroxide-containing solid, preferably an industrial or municipal solid waste stream such as fly ash, bottom ash, slags, and the like, that contain oxides or hydroxides (e.g., calcium oxides, calcium hydroxide, calcium silicate hydrate, silicon oxides, aluminum oxides, and the like). An aqueous solution of carbonate (i.e., the first aqueous carbonate solution) is also introduced into the carbonation reactor 10. The reaction is then allowed to proceed in reactor 10 until a portion of the oxide present in the ash and/or slag is converted into a carbonate. At least part of that carbonate so formed then precipitates from the aqueous carbonate solution. As shown in the FIGURE, the pH in the carbonation reactor is alkaline—preferably around pH 12.5 or greater. Simultaneously, an aqueous hydroxide is formed in the first aqueous carbonate solution.

The products from the reactor 10 are then filtered at box 12. The carbonate precipitate is separated from the liquid fraction of the product stream. The separation mechanism is not critical. As shown in the FIGURE, box 12 is identified as "Filtration." Any apparatus, means, or mechanism, now known or developed in the future for separating solids from liquids may be used. The carbonated precipitate is shunted to the bottom half of the FIGURE (more below). The liquid fraction (the "leachate") exiting from the right of the filtration unit 12 comprises an aqueous hydroxide solution. It too is alkaline. The aqueous hydroxide solution is transferred to a $CO_2$ reactor or absorption column 14. Also input into reactor 14 is $CO_2$-rich flue gas or any other $CO_2$-containing gaseous stream 16 from which at least a portion of the $CO_2$ is to be captured. In reactor 14, the hydroxide ions in the aqueous hydroxide solution coming from filtration unit 12 react with the gaseous carbon dioxide coming from 16 for a time, at a temperature, and under conditions wherein at least a portion of the gaseous carbon dioxide is sequestered into a second aqueous carbonate solution. Any remaining gases and unreacted $CO_2$ exit reactor 14 at flue or exhaust 18. The aqueous carbonate solution so formed (deemed the second aqueous carbonate solution) is recirculated via conduit 20 and used as the first carbonate solution and the process starts anew.

As shown in the FIGURE, the method is implemented in a continuous fashion, which is greatly preferred. It may, however, be performed batchwise or semi-batchwise.

The lower half of the FIGURE, below line 22, illustrates making precipitated calcium carbonate (PCC) from the precipitate exiting the filtration unit 12. The precipitate from filtration unit 12 is passed into a dissolution reactor 24. In reactor 24, the precipitate is mixed with water under a blanket of gaseous carbon dioxide at a pressure above atmospheric pressure, for a time, and at a temperature where at least a portion of the calcium carbonate dissolves into the water to yield a solution comprising calcium carbonate. The carbon dioxide is preferably provided at a pressure of from about 2 to about 10 atmospheres and is provided by $CO_2$ compressor 28. This treatment results in calcium carbonate being selectively dissolved into the water.

The liquid phase and any remaining solids are then separated at filter unit 26. The solids, which are typically rich in silicates, exits the left of separator 26. The liquid portion is then degassed at 30, which causes spontaneous precipitation of the calcium carbonate dissolved in the liquid. The released carbon dioxide is again compressed at 28 and recycled back into the dissolution reactor 24.

The precipitated calcium carbonate is separated from the remaining liquid at filtration unit 32. The two streams exiting the unit 32 are thus the PCC product and a wastewater stream.

What is claimed is:

1. A method of sequestering gaseous carbon dioxide, the method comprising:
    (a) carbonating an oxide or hydroxide by contacting a material comprising the oxide or hydroxide with a first aqueous carbonate solution for a time, at a temperature, and under conditions wherein:
        (i) at least a portion of the oxide or hydroxide is converted into a carbonate and wherein at least a portion of the carbonate so formed precipitates from the aqueous carbonate solution, to yield a precipitate; and
        (ii) an aqueous hydroxide solution is formed; and
    (b) contacting the aqueous hydroxide solution of step (a)(ii) with gaseous carbon dioxide for a time, at a temperature, and under conditions wherein at least a portion of the gaseous carbon dioxide is sequestered into a second aqueous carbonate solution.

2. The method of claim 1, wherein the material comprising the oxide or hydroxide in step (a) comprises solid industrial waste.

3. The method of claim 2, wherein the industrial waste is selected from the group consisting of fly ash, bottom ash, slag, and crushed concrete.

4. The method of claim 1, further comprising using at least a portion of the second aqueous carbonate solution of step (b) as at least a portion of the first aqueous carbonate solution of step (a).

5. A method of sequestering gaseous carbon dioxide, the method comprising:
(a) carbonating an oxide or hydroxide by contacting a material comprising the oxide or hydroxide with a first aqueous carbonate solution for a time, at a temperature, and under conditions wherein:
(i) at least a portion of the oxide or hydroxide is converted into a carbonate and wherein at least a portion of the carbonate so formed precipitates from the aqueous carbonate solution to yield a precipitate; and
(ii) an aqueous hydroxide solution is formed;
(b) contacting the aqueous hydroxide solution of step (a)(ii) with gaseous carbon dioxide for a time, at a temperature, and under conditions wherein at least a portion of the gaseous carbon dioxide is sequestered into a second aqueous carbonate solution; and
(c) using at least a portion of the second aqueous carbonate solution of step (b) as at least a portion of the first aqueous carbonate solution of step (a).

6. The method of claim 5, wherein the material comprising the oxide or hydroxide in step (a) comprises solid industrial waste.

7. The method of claim 6, wherein the industrial waste is selected from the group consisting of fly ash, bottom ash, slag, and crushed concrete.

8. The method of claim 5, wherein the first and second aqueous carbonate solutions comprise one or more water-soluble carbonates selected from the group consisting of sodium carbonate, potassium carbonate, sodium bicarbonate, and potassium bicarbonate.

9. The method of claim 5, wherein the first and second aqueous carbonate solutions comprise one or more water-soluble carbonates selected from the group consisting of sodium carbonate and sodium bicarbonate, and the aqueous hydroxide solution formed in step (a)(ii) comprises sodium hydroxide.

10. The method of claim 5, wherein the first and second aqueous carbonate solutions comprise one or more water-soluble carbonates selected from the group consisting of potassium carbonate and potassium bicarbonate, and the aqueous hydroxide solution formed in step (a)(ii) comprises potassium hydroxide.

11. The method of claim 5, wherein in step (a), the first aqueous carbonate solution is saturated with carbonate.

12. The method of claim 5, wherein in step (a), the aqueous carbonate solution has a carbonate concentration of from about 0.01 M to about 3.0 M carbonate.

13. The method of claim 5, wherein step (a) comprises contacting the material comprising the oxide or hydroxide with the first aqueous carbonate solution for about 5 minutes to about 24 hours, at a temperature of about 20° C. to about 100° C., at a pressure of about 1 atmosphere.

14. The method of claim 5, wherein the material comprising the oxide or hydroxide is bulk particulate matter having a mean particle diameter no larger than about 1 mm.

15. The method of claim 5, wherein the material comprising the oxide or hydroxide is bulk particulate matter having a mean particle diameter no larger than about 100 micrometers.

16. The method of claim 5, comprising contacting the material comprising the oxide or hydroxide with the first aqueous carbonate solution at a loading of from about 1 mL to about 500 mL first aqueous carbonate solution per gram material comprising the oxide.

17. The method of claim 5, wherein the oxide or hydroxide of step (a) comprises calcium, and the precipitate of step (a)(i) comprises calcium carbonate, and further comprising:
(d) contacting the precipitate of step (a)(i) with water and gaseous carbon dioxide at a pressure above atmospheric pressure, for a time, and at a temperature where at least a portion of the calcium carbonate dissolves into the water to yield a solution comprising calcium carbonate.

18. The method of claim 17, further comprising, after step (d):
(e) separating at least a portion of the solution comprising calcium carbonate from any remaining solids; and then
(f) reducing the pressure of the carbon dioxide to a level wherein calcium carbonate precipitates from the solution comprising calcium carbonate.

19. The method of claim 18, wherein in step (d) the pressure of the carbon dioxide is from about 2 to about 10 atmospheres.

20. The method of claim 18, wherein the temperature of step (d) is from about 10° C. to about 50° C.

* * * * *